(No Model.) 4 Sheets—Sheet 1.

W. B. GRAY & D. F. BOWEN.
TICKET PRINTING MACHINE.

No. 521,438. Patented June 12, 1894.

WITNESSES:
Ida J. O'Brien
Chas. E. Dawson

INVENTORS
W. B. Gray and
D. F. Bowen
BY
A. J. O'Brien
ATTORNEY (No Model.) 4 Sheets—Sheet 2.

W. B. GRAY & D. F. BOWEN.
TICKET PRINTING MACHINE.

No. 521,438. Patented June 12, 1894.

WITNESSES:
G. J. Vollandet
Chas. E. Dawson

INVENTORS
W. B. Gray
D. F. Bowen
BY
ATTORNEY (No Model.) 4 Sheets—Sheet 3.
W. B. GRAY & D. F. BOWEN.
TICKET PRINTING MACHINE.
No. 521,438. Patented June 12, 1894.
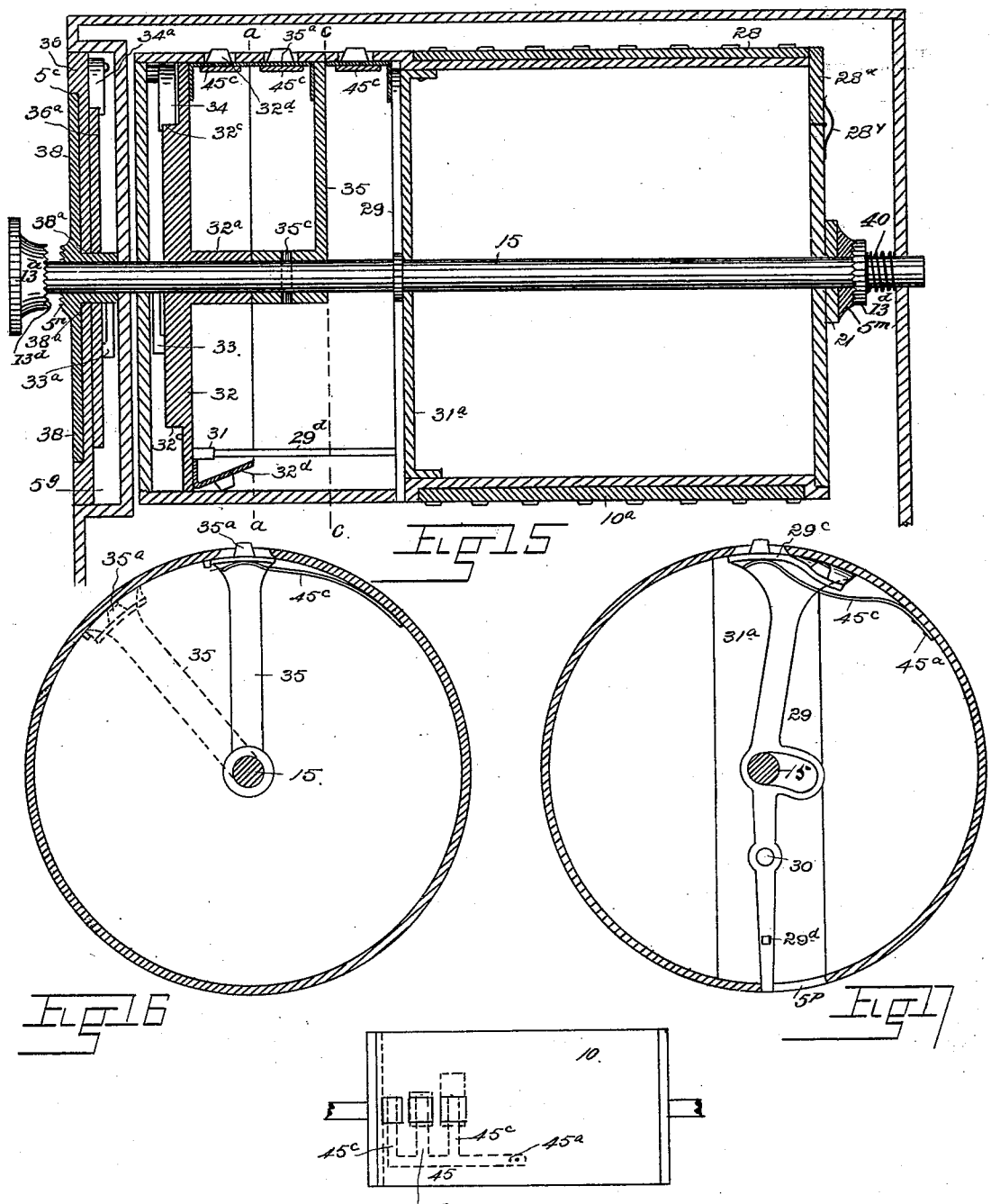
WITNESSES:
Ida J. O'Brien
Chas. E. Dawson
INVENTORS
W. B. Gray and
D. F. Bowen
BY
A. J. O'Brien
ATTORNEY
THE NATIONAL LITHOGRAPHING COMPANY,
WASHINGTON, D. C.

(No Model.) 4 Sheets—Sheet 4.

W. B. GRAY & D. F. BOWEN.
TICKET PRINTING MACHINE.

No. 521,438. Patented June 12, 1894.

WITNESSES:  INVENTORS

UNITED STATES PATENT OFFICE.

WILLIAM B. GRAY AND DAVID F. BOWEN, OF DENVER, COLORADO.

TICKET-PRINTING MACHINE.

SPECIFICATION forming part of Letters Patent No. 521,438, dated June 12, 1894.

Application filed November 13, 1893. Serial No. 490,867. (No model.)

*To all whom it may concern:*

Be it known that we, WILLIAM B. GRAY and DAVID F. BOWEN, citizens of the United States of America, residing at Denver, in the county of Arapahoe and State of Colorado, have invented certain new and useful Improvements in Ticket-Printing Devices; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to an improved ticket printing device, and is specially designed for use by conductors on street railways, and consists of the features, arrangements and combinations hereinafter described and claimed all of which will be fully understood by reference to the accompanying drawings in which is illustrated an embodiment thereof.

Figure 1:
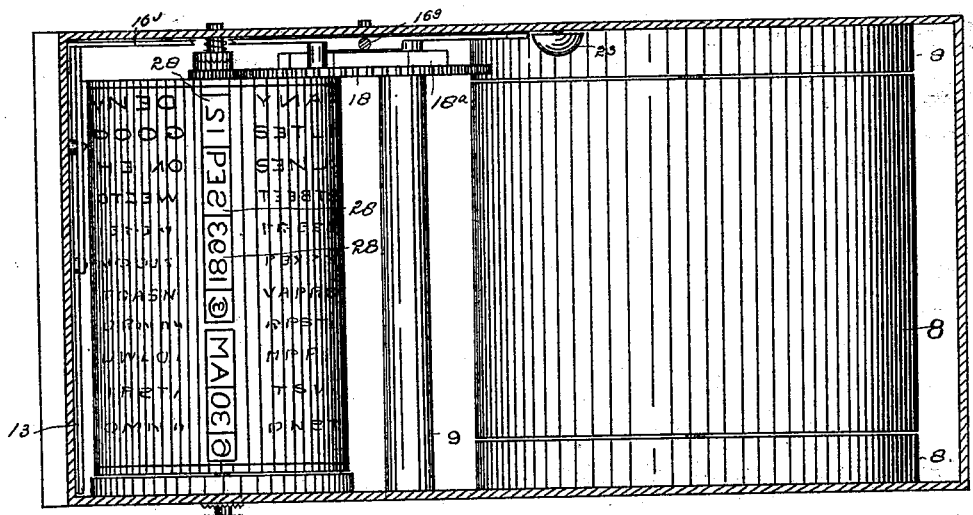
Figure 2:
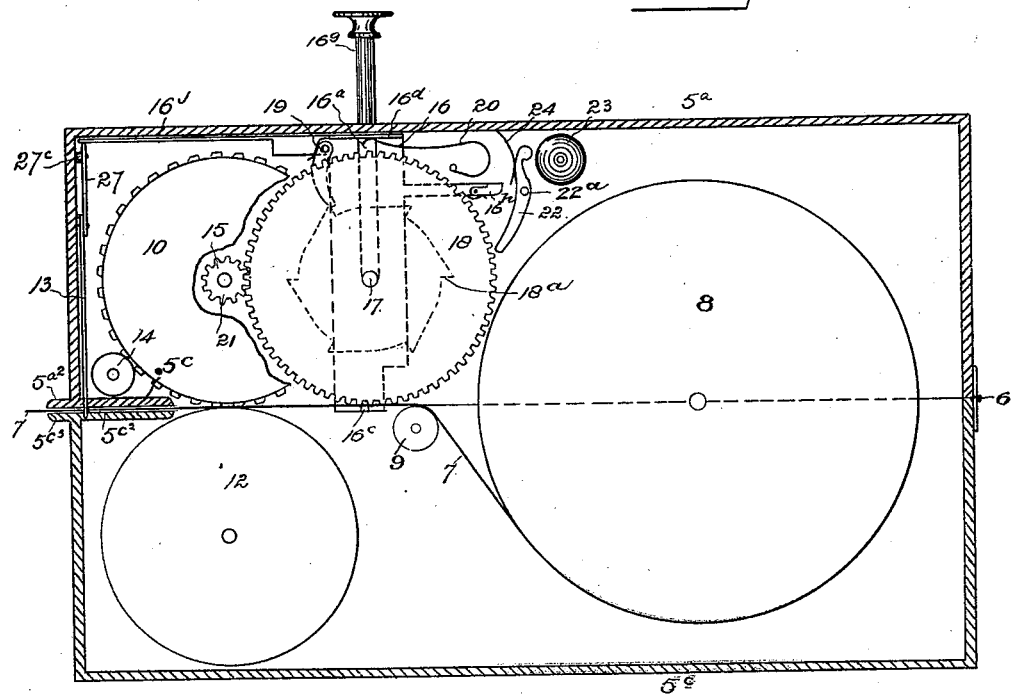
Figure 3:
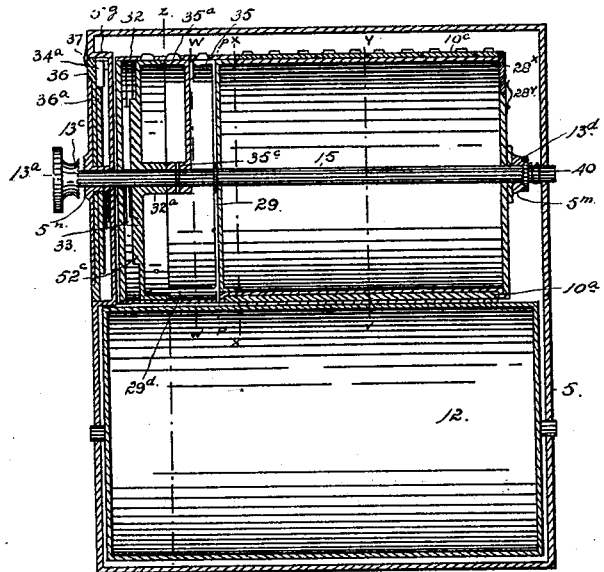
Figure 4:
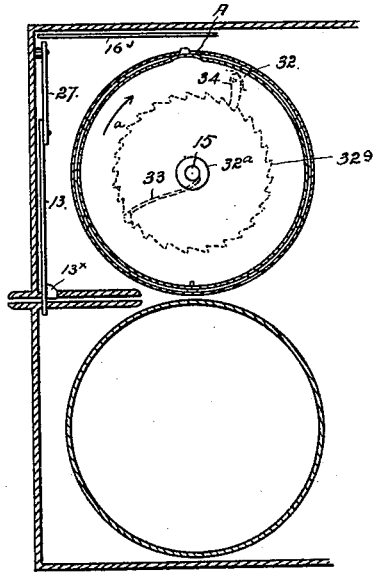
Figure 5:
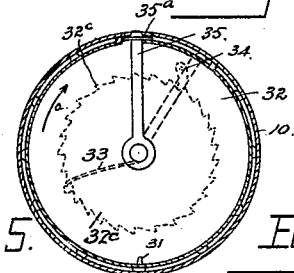
Figure 6:
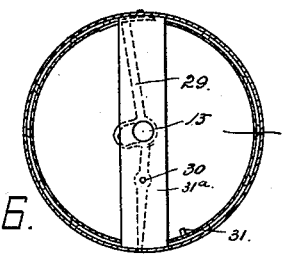
Figure 7:
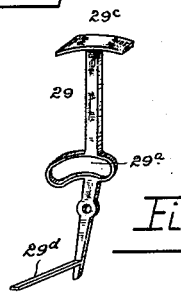
Figure 10:
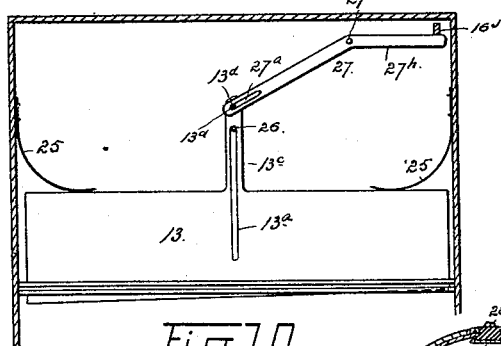
Figure 8:
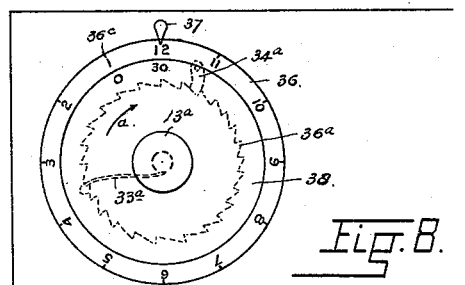
Figure 9:
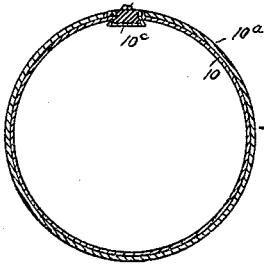
Figure 14:
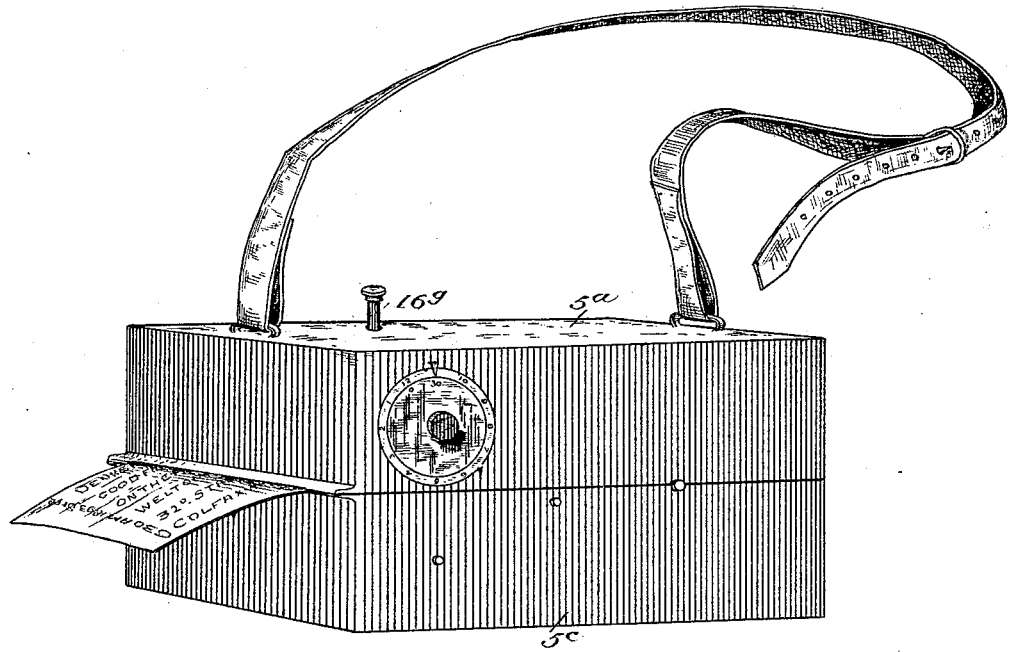
Figures 12, 13:
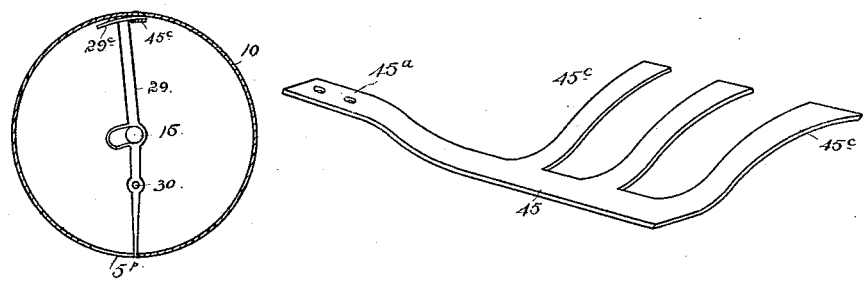

In the drawings, Figure 1 is a horizontal longitudinal section taken through the casing, the interior mechanism being shown in plan view. Fig. 2 is a vertical longitudinal section of the casing, the interior mechanism being shown in side elevation. Fig. 3 is a vertical section taken on the line $c-c$, Fig. 2. Fig. 4 is a section taken on the line $z-z$, Fig. 3. Fig. 5 is a cross section taken through the printing drum on the line $w-w$, Fig. 3. Fig. 6 is a similar section taken on the line $x-x$, Fig. 3. Fig. 7 is a perspective view of an adjustable device, whereby the "A. M." and "P. M." time designations are alternately exposed on the face of the printing drum. Fig. 8 is a side elevation of part of the casing showing the disk employed as a guide in adjusting the printing drum. Fig. 9 is a section taken on the line $y-y$, Fig. 3. Fig. 10 is a vertical section taken through the casing. Fig. 11 is an outline view of the drum, illustrating by dotted lines, a spring attached to its inner surface. Fig. 12 is a perspective view of a spring employed in connection with the flexible printing faces of the adjustable parts. Fig. 13 is a cross section taken on the line $p-p$, Fig. 3. Fig. 14 is a perspective view of the complete device. Fig. 15 is a longitudinal section taken through the printing drum, the casing being shown partly broken away. Fig. 16 is a cross-section of the drum taken on the line $a-a$, Fig. 15. Fig. 17 is a similar section taken on the line $c-c$, same figure.

Similar reference characters indicating corresponding parts or elements of the mechanism in the several views, let the numeral 5 designate the outer casing composed of two parts $5^a$ and $5^c$, hinged together as shown at 6, the two parts being respectively provided with the interiorly and exteriorly projecting jaws $5^{a2}$, $5^{a3}$, $5^{c2}$ and $5^{c3}$, through which is thrust the strip 7 of paper from the roll 8, journaled in the casing on the line dividing the two parts $5^a$ and $5^c$. In the part $5^c$ just below the line marking the division between the two casing parts, is pivoted the small guide roller 9, over which the strip 7 passes as it leaves roll 8. The highest point of the face of the guide roller preferably lies in the plane dividing the two parts of the casing. After leaving the guide roller, the paper strip passes between the printing drum 10 and the supporting roll 12, the former being loosely mounted upon a spindle 15 journaled in the part $5^a$ of the casing, while the roller is journaled in the part $5^c$.

The strip 7 is printed by the roll 10 and passes thence between the jaws heretofore described, and after being thrust out to the proper ticket length, the ticket is severed from the main strip by the knife 13, the construction and operation of which will be hereinafter set forth.

Just above the jaws of the casing, or at any other suitable point, and pivoted in the sides of the part $5^a$ thereof, is the inking roller 14, so located that its face engages the face of the printing drum 10, the function of this roller being to supply the drum with the necessary fluid for printing the tickets, as the strip of paper is passed between the drum 10 and the roll 12.

The means for actuating the printing drum for the purpose of printing the tickets and feeding the printed portion of the strip of paper through the jaws of the casing, will now be described.

Let 16 designate a vertically reciprocating plate provided with a slot 16ᵃ engaging the shaft 17 of a gear 18 revolving in part 5ᵃ of the casing. This plate is located between one side of the casing and the gear wheel 18 provided with an integral ratchet part 18ᵃ formed on the face adjacent to the plate 16. The upper part of the plate 16 is provided with a spring actuated pivoted dog 19 whose lower extremity engages the teeth of the ratchet 18ᵃ. The lower portion of the plate is provided with an upwardly projecting tooth 16ᶜ which normally enters the cogs or teeth of the gear 18 and locks the latter from movement. The plate 16 is held in its normal position by means of a spring 20 attached to the casing at one extremity and bearing against a suitable stop 16ᵈ at its opposite or free extremity. This plate 16 is further provided with a pin 16ᵍ which passes through an aperture formed in the top of the casing and protrudes therefrom sufficiently to allow the plate the required vertical movement in the performance of its function. This pin is provided with a head fashioned to afford a suitable bearing surface for the thumb or finger, of the person using the device. The teeth or cogs of the gear 18 engage or mesh with the cogs of a smaller gear 21 made fast to one extremity of the printing drum. Now, from the description immediately preceding, it will be observed that when the plate 16 is thrust downward by pressing the pin 16ᵍ, the dog 19 will engage the ratchet 18ᵃ, actuate the gear 18 and impart a certain movement to the printing drum through the engagement of the gear 18 with the gear 21, the arrangement of the parts co-operating to produce this result being such, that for each downward movement of the plate 16, the gear 18 is moved sufficiently to impart a complete revolution to the printing drum, whereby a ticket-length of the strip 7 is printed and thrust outward between the jaws of the casing.

Another feature must also be observed in the arrangement of these parts; namely, that the dog 19 shall not engage the ratchet 18ᵃ until the plate 16 has moved downward sufficiently to disengage the tooth 16ᶜ from the teeth of the gear 18 in order to unlock said gear. The plate 16 is also provided with a projection 16ʰ, normally located in close proximity to one extremity of a spring-actuated lever 22 fulcrumed on the casing as shown at 22ᵃ and adapted to form the hammer for a small gong 23 attached to the casing in suitable proximity to the spring-actuated arm of the lever.

From the construction, it will be observed that as the plate 16 is moved downward, one arm of the lever 22 will be first carried downward and suddenly released, when the opposite arm, under the influence of the spring 24, will be driven to contact with the gong, the arrangement of the parts being such that when this signal is given, the plate 16 has performed its function in imparting a complete rotation to the printing drum.

When a ticket-length of the strip 7 has been printed and thrust out of the casing as heretofore described, the knife 13 is brought into requisition to sever this printed part, or ticket, from the body of the strip. This knife is located in the front end of the casing, and normally occupies or engages a slot formed in the jaws through which the strip 7 passes; it is held in this position by two springs 25 attached to the casing and bearing against the top of the knife which is vertically reciprocating; and in order to secure its proper action, it is provided with a vertical slot 13ᵃ engaging a stationary pin 26 made fast to the casing. The knife is further provided with a central, upward projection 13ᵉ carrying a pin 13ᵈ engaging a slot 27ᵃ formed in one arm of the lever 27 fulcrumed on the casing as shown at 27ᶜ, the opposite arm of the lever engaging a horizontal arm 16ʲ formed integral with the plate 16, the arm 16ʲ being located above the lever arm. Hence as the plate 16 is thrust downward in printing the strip, and feeding the ticket from the box or casing, the arm 27ʰ is carried downward, while the opposite arm is moved upward, and the knife 13 raised against the springs 25. The lever 27 and the arm 16ʲ are so arranged that just as the plate 16 reaches its downward limit of movement, of the movement necessary (acting in conjunction with the other parts) to print and thrust out the ticket, the arm 27ʰ of the lever is released and the knife 13 thrust quickly downward by the recoil of the springs 25, whereby the printed ticket is severed from the strip 7.

The cutting edge of the knife 13 preferably tapers gradually from one end of the knife to the other as shown in Fig. 10, whereby each point on the edge of the knife engages the strip to be cut at a different instant, thus increasing the efficiency of the knife as compared with one whose entire edge engages the strip simultaneously. The knife 13 may be provided with projections 13ˣ for the purpose of holding the strip of paper in place when the ticket has been severed from the strip 7 by the knife 13.

The construction of the printing drum will now be described in detail, special attention being given to the arrangement and adjustment of the parts, whereby the function of said drum is subserved: The greater portion of the drum's outer surface or printing face is covered by a pad or layer 10ᵃ of some suitable material upon which are formed the necessary characters for printing the body of the ticket. This pad 10ᵃ is pasted, or otherwise suitably secured upon the drum, the face proper of the latter being depressed between its end plates to receive the pad. The drum is further provided with a longitudinal pocket 10ᶜ having a dove-tail shape in cross section and adapted to receive blocks 28 of corresponding shape, and upon which are formed the characters for printing certain time and other designations which are subject to change, namely, the year, month, day of month, number of the car, &c. These blocks 28 are not adjustable in the drum, but are simply removable, being slipped into the dove-tail pocket 10$^a$ and left in the same position until blocks for printing other years, months or days, are needed, when the old ones are removed and new ones supplied. Blocks 28 are held in place by a hinged part 28$^x$ cut out of one of the end plates of drum 10 and hinged thereto and held closed by a small spring 28$^y$. The operator in changing these blocks 28, presses down part 28$^x$, which enables him to remove blocks 28, and to place others in the dove-tail pocket 10$^a$. In the case, however, of the other time designations: namely, A. M., P. M., the hours and their fractions, it is necessary, or at least advisable to have them formed upon an adjustable part, whereby they may be quickly regulated with much less inconvenience than would be experienced in removing blocks and inserting new ones.

The characters 1, 2, 3, &c., for printing the hours are formed upon the peripheral face 32$^d$ of a disk 32 loosely mounted upon the spindle 15 of the drum, said spindle passing through a sleeve 32$^a$ formed on the disk 32 and provided with a ratchet face 32$^c$ indicated in dotted lines in Figs. 4 and 5. Made fast to the spindle at one extremity and engaging the teeth of this ratchet face at the opposite extremity is a spring pawl 33, whereby as the spindle is rotated in the direction indicated by arrow $a$, the disk 32 is turned to expose any desired character upon its face, the drum remaining stationary as hereinafter described, during this adjustment. The face 32$^d$ of the disk 32 is composed of some yielding material whose resiliency is such that it will bend inward and remain within the drum, except at the point of crossing the printing slot, when, by the assistance of an arm 45$^c$ of the spring 45 (hereinafter mentioned), the face of the disk is pressed outward through the slot to the plane of printing. The ratchet 32$^c$ is further engaged by a pawl 34 which permits the disk 32 to move in the direction indicated by arrow $a$, but locks it from movement in the opposite direction. Hence, after turning the spindle to expose the proper numeral on disk 32, the movement of the spindle is reversed to expose "30" or any other fractional hour designation formed on a yielding face plate 35$^a$ of an arm 35 made fast on the spindle. Thus any desired combination of numerals for expressing hours and fractions of hours, may be obtained, since the spindle is rotated in one direction to expose the characters designating hours, and in the opposite direction to expose the characters designating the fractions of hours. The arm 35 is made fast on the spindle by a pin 35$^c$ passed through coinciding apertures formed in the spindle and the sleeve of the arm.

For changing the designations A. M. and P. M., the following mechanism is employed: Let the numeral 29 designate a lever centrally provided with an elongated aperture through which the spindle 15 of the drum passes. This lever is fulcrumed below the spindle on a stationary pin 30 attached to a plate 31$^a$ placed cross-wise in the drum. The upper extremity of this lever 29 is provided with a yielding face-plate 29$^c$ upon which are formed the characters A. M. and P. M., or those designating ante and post meridian time, said characters being sufficiently raised to project above the surface of the printing drum and make an impression upon the strip 7 as the drum is rotated. The slot or opening in the drum is only of a width sufficient to expose the A. M. or the P. M. characters, but not both sets at the same time. On the inside of disk 32 is formed a short projection 31 adapted to engage a projection 29$^d$ formed integral with the lever 29 and extending at right angles to the body portion thereof. Projection 31 is so located in disk 32 as to almost engage the projection 29$^d$ of lever 29 at the time that the numeral "11" of the face plate of disk 32 is exposed through the slot in the drum. Assuming that the lever 29 and the pin 31 are in the above mentioned position, in Fig. 6, and that the P. M. part of the face 29$^c$ is exposed, as soon as the disk 32 is moved forward so as to expose numeral "32" on its periphery, the pin 31 will engage the short arm of the lever and shift the face plate and expose the P. M. part thereof, this plate being sufficiently flexible or yielding to admit of its passing inside the shell of the drum, the opening or slot in the shell being cut away underneath as shown at A in Fig. 4 to facilitate the accomplishment of this object. The arrangement of the lever 29 and its actuating pin 31 is such that when the pin has moved the lever sufficiently to accomplish the aforesaid object, the pin will release the lever by reason of the fact that the part 29$^d$, or the short arm of lever 29, moves in an arc whose radius is less than that of the disk. After the lever 29 has been thus shifted to print A. M. on the tickets, the disk 32 may be rotated without interfering with the lever, since its pin 29$^d$ is out of the path of the projection or pin 31. When, however, it is desired to print P. M., some suitable device is inserted in an aperture 5$^b$ formed in the drum (see Fig. 17) through which the short arm of the lever is exposed, and the position of the lever reversed. In order to make this adjustment of the disk 32 and the arm 35 practicable, it is necessary that there should be some guide for the operation, whereby this adjustment may be effected without opening the case. The mechanism to accomplish this object will now be described. That portion of the casing surrounding the opening through which protrudes the extremity of the spindle, to which is attached the milled head 13$^a$, is depressed as shown at 5$^g$ to receive the disk 36 loosely mounted on the projecting sleeve 38$^a$ of a disk 38 which is loosely mounted upon the spindle. Disk 36 has an integral ratchet face 36$^a$, the teeth of the face being engaged by one extremity of a spring pawl 33ª fastened to sleeve 38ª of disk 38, whereby the disk 36 is turned with disk 38 when the latter is rotated in the direction indicated by arrow $a$ in Fig. 8, while when disk 38 is moved in the opposite direction, the disk 36 is locked from movement by a dog 34ª suitably attached to the rim surrounding the depressed part 5$^g$ of the casing. The outer portion of the face of disk 36 is provided with the numerals 1, 2, 3, &c., corresponding with the numerals or characters on the peripheral face of disk 32, both as to character and location. Made fast to the casing in any suitable manner is the pointer 37 which presses against the face of disk 36 upon which the hour numerals are formed. This pointer engages a niche 36$^c$ formed in the face of the disk at each numeral, whereby there is a decided click as the pointer engages the niche, and whereby the disk is temporarily held in any desired position to correspond with the position of disk 32. The face of the disk 36 within the rim, (upon which are exposed the numerals) is recessed to receive the above mentioned disk 38. This disk 38 is provided with the numerals designating the fractions of hours as "30," and corresponding with that shown on the face 35ª of the arm 35. Hence when the numeral on the face of the disk 36 designating the proper hour of the day has been turned to the pointer 37 by turning the spindle, and with it, disk 38, in one direction, and the numeral "30" made to occupy a corresponding position by reversing the movement of the disk 38, the operator knows that the drum 10 will print the proper hour and fraction of the hour, on the ticket.

During the operation of adjusting the disks 32 and 36, and the parts that co-operate with them, the drum is stationary, the same being locked by the engagement of the gear 18 with the gear 21, the former being held in position by the tooth 16$^c$. Hence, while operating the vertically reciprocating plate 16 in printing the ticket and feeding it from the case, the spindle must be locked upon, and move with the drum, since the part 35 made fast to the spindle must move with the drum. To accomplish this result, the spindle is longitudinally movable within the drum and casing, and provided at one extremity with the clutch face 13$^d$, normally engaging a corresponding face 5$^m$ formed on the adjacent drum extremity, the two faces being held in engagement by means of a coil spring 40 surrounding the spindle and located between the casing and the clutch 13$^d$ on the spindle.

When it is desired to move the spindle independently of the drum, as in the adjustments heretofore explained, it is only necessary to push the spindle, and cause a clutch face 13$^e$ at the opposite extremity to engage a clutch 5$^n$ formed upon the fast disk 38, which in this way, will move with the spindle.

In order to hold the printing faces of the parts 29, 32 and 35 in suitable operative relation with the strip 7, upon which they are to print, it may be found necessary to employ a leaf spring 45 (shown by dotted lines in Fig. 11) the same being made fast to the drum at its extremity 45ª, and provided with branches 45$^c$ which engage the respective backs of the parts mentioned.

From the foregoing description, it is believed that the operation of the device will be readily understood. It is specially intended for use as a portable ticket printing device to be carried by the conductors of cars, in which case it would be attached to the person in some suitable manner. The mechanism may, however, be made larger if desired, and used as a stationary machine without in any manner departing from the spirit of the invention.

The tickets are printed, fed through the jaws of the casing, and cut off through the agency of the vertically movable plate 16, while the adjustments necessary previous to the printing operation, are accomplished through the instrumentality of the spindle.

Having thus described our invention, what we claim is—

1. The combination with the casing of a slotted printing drum journaled therein, and provided with movable blocks, and devices mounted on the drum-spindle, and independently adjustable for changing the time-printing designations, said devices consisting of a disk loosely mounted on the drum-spindle, and so connected therewith that it moves with said spindle in one direction only, said disk having a yielding printing face, and an arm made fast to the spindle, and also having a yielding printing face, one of said devices carrying the hour designations, and the other, the fractional hour designations, substantially as described.

2. The combination with the casing of a slotted printing drum, the spindle journaled in the casing and carrying the drum, a disk loosely mounted on the drum-spindle, and so connected therewith that it moves with the spindle in one direction only, said disk having a yielding printing face, an arm made fast to the spindle, and also having a yielding printing face, and a lever located in the drum and carrying a yielding face-plate upon which are formed the characters designating ante and post meridian time, said lever being adjustable, whereby its position may be reversed at certain intervals, according as it is necessary to expose the one or the other designation, substantially as described.

3. In a ticket printing device, the combination with a suitable casing, the printing drum provided with a gear attached to one end thereof, the spring supported reciprocating plate 16 provided with a stem protruding from the casing and having a pawl, a gear wheel 18 engaging the gear on the drum and provided with a ratchet face, a pawl attached to the plate and engaging the teeth of the ratchet, a locking pin or tooth made fast on said plate and engaging the gear 18, the arrangement being such that as the plate 16 is actuated, the wheel 18 is unlocked before the pawl engages its ratchet face, substantially as described.

In testimony whereof we affix our signatures in the presence of two witnesses.

WILLIAM B. GRAY.
DAVID F. BOWEN.

Witnesses:
G. J. ROLLANDET,
CHAS E. DAWSON.